United States Patent
Nagasaka

(10) Patent No.: US 10,584,893 B2
(45) Date of Patent: Mar. 10, 2020

(54) CONTROL APPARATUS AND CONTROL METHOD

(71) Applicant: SONY CORPORATION, Tokyo (JP)

(72) Inventor: Hideo Nagasaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/061,981

(22) PCT Filed: Sep. 26, 2016

(86) PCT No.: PCT/JP2016/078290
§ 371 (c)(1),
(2) Date: Jun. 13, 2018

(87) PCT Pub. No.: WO2017/119158
PCT Pub. Date: Jul. 13, 2017

(65) Prior Publication Data
US 2018/0372365 A1   Dec. 27, 2018

(30) Foreign Application Priority Data
Jan. 5, 2016   (JP) ................. 2016-000575

(51) Int. Cl.
*F24F 11/89*   (2018.01)
*G06Q 50/06*   (2012.01)
(Continued)

(52) U.S. Cl.
CPC ............. *F24F 11/89* (2018.01); *F24F 11/52* (2018.01); *F24F 11/62* (2018.01); *G05B 15/02* (2013.01);
(Continued)

(58) Field of Classification Search
CPC ........ F24F 11/89; F24F 11/00; F24F 11/0034; H02J 3/14; H02J 2003/143; H02J 2003/003
See application file for complete search history.

(56) References Cited

U.S. PATENT DOCUMENTS

| | | | |
|---|---|---|---|
| 2010/0251336 A1* | 9/2010 | Allen, Jr. | G06F 21/316 726/4 |
| 2013/0325190 A1* | 12/2013 | Imes | G05B 15/02 700/276 |
| 2017/0302077 A1* | 10/2017 | Yabe | H02J 3/14 |

FOREIGN PATENT DOCUMENTS

| | | |
|---|---|---|
| JP | 2001-324202 A | 11/2001 |
| JP | 2013-128368 A | 6/2013 |

(Continued)

OTHER PUBLICATIONS

International Search Report and Written Opinion of PCT Application No. PCT/JP2016/078290, dated Dec. 6, 2016, 10 pages of English Translation and 08 pages of ISRWO.
(Continued)

*Primary Examiner* — Curtis B Odom
(74) *Attorney, Agent, or Firm* — Chip Law Group

(57) ABSTRACT

A control apparatus and control method which enable equipment to be controlled adaptively to a user who gives a response in a scene where a request is made from outside. A control apparatus including a judging unit that determines control content of equipment in accordance with a request from outside, an inquiry unit that presents information in accordance with the request from the outside to a first user and make an inquiry to the first user as to approval regarding the control content judged by the judging unit, and an equipment control unit that controls the equipment in accordance with a response to the inquiry and information relating to the first user.

20 Claims, 9 Drawing Sheets

(51) Int. Cl.

| | | |
|---|---|---|
| *H02J 3/14* | (2006.01) | |
| *H04Q 9/00* | (2006.01) | |
| *G06F 13/00* | (2006.01) | |
| *F24F 11/62* | (2018.01) | |
| *F24F 11/52* | (2018.01) | |
| *H04M 11/00* | (2006.01) | |
| *G08C 17/02* | (2006.01) | |
| *H02J 13/00* | (2006.01) | |
| *G05B 15/02* | (2006.01) | |
| *G06F 13/14* | (2006.01) | |
| *F24F 120/00* | (2018.01) | |
| *F24F 140/50* | (2018.01) | |

(52) U.S. Cl.
 CPC ............... *G06F 13/00* (2013.01); *G06F 13/14* (2013.01); *G06Q 50/06* (2013.01); *G08C 17/02* (2013.01); *H02J 3/14* (2013.01); *H02J 13/00* (2013.01); *H04M 11/00* (2013.01); *H04M 11/007* (2013.01); *H04Q 9/00* (2013.01); *F24F 2120/00* (2018.01); *F24F 2140/50* (2018.01); *G05B 2219/2614* (2013.01); *G05B 2219/2642* (2013.01); *G08C 2201/51* (2013.01); *H04Q 2209/60* (2013.01)

(56) References Cited

FOREIGN PATENT DOCUMENTS

| | | |
|---|---|---|
| JP | 2013-155922 A | 8/2013 |
| JP | 2015-108464 A | 6/2015 |
| JP | 2015-143914 A | 8/2015 |
| WO | 2013/094319 A1 | 6/2013 |

OTHER PUBLICATIONS

International Preliminary Report on Patentability of PCT Application No. PCT/JP2016/078290, dated Jul. 19, 2018, 10 pages of English Translation and 05 pages of IPRP.

* cited by examiner

FIG. 6

| 600 DATE AND TIME | 602 CONTENT OF REQUEST | 604 PRESENCE OR ABSENCE RESPONSE | 606 RESPONDENT | 608 CONTENT OF RESPONSE | 610 METHOD OF RESPONSE |
|---|---|---|---|---|---|
| 2015/8/10 9:00 | SET SET TEMPERATURE OF AIR CONDITIONER AT 27°C | YES | HANAKO SUZUKI | OK | SOUND |
| 2015/8/13 10:30 | LOWER POWER CONSUMPTION BY 200 W | NO | — | — | — |
| 2015/8/20 10:30 | SET SET TEMPERATURE OF AIR CONDITIONER AT 27°C | YES | TARO SUZUKI | NG | SMARTPHONE |
| ... | ... | ... | ... | ... | ... |

60

CONTROL APPARATUS AND CONTROL METHOD

CROSS REFERENCE TO RELATED APPLICATIONS

This application is a U.S. National Phase of International Patent Application No. PCT/JP2016/078290 filed on Sep. 26, 2016, which claims priority benefit of Japanese Patent Application No. JP 2016-000575 filed in the Japan Patent Office on Jan. 5, 2016. Each of the above-referenced applications is hereby incorporated herein by reference in its entirety.

TECHNICAL FIELD

The present disclosure relates to a control apparatus and a control method.

BACKGROUND ART

In related art, a wide variety of techniques for automatically controlling various types of equipment such as, for example, cooling and heating equipment have been developed.

For example, Patent Literature 1 discloses a technique of determining a recommended set temperature in accordance with a difference between a total power supply amount at a power supplier and a power demand level, presenting the recommended set temperature to a user and controlling air-conditioning equipment in accordance with a response from the user.

CITATION LIST

Patent Literature

Patent Literature 1: JP 2001-324202A

DISCLOSURE OF INVENTION

Technical Problem

However, with the technique disclosed in Patent Literature 1, the air-conditioning equipment is controlled only in accordance with content of the response regardless of the user who gives the response. Therefore, even in the case where the response has been given by an inappropriate user such as, for example, a child, the air-conditioning equipment is controlled.

Therefore, the present disclosure proposes a new and improved control apparatus, control method and program which enable equipment to be controlled adaptively to a user who gives a response in a scene where a request is made from outside.

Solution to Problem

According to the present disclosure, there is provided a control apparatus including: a judging unit configured to judge control content of equipment in accordance with a request from outside; an inquiry unit configured to present information in accordance with the request from the outside to a first user and make an inquiry to the first user as to approval regarding the control content judged by the judging unit; and an equipment control unit configured to control the equipment in accordance with a response to the inquiry and information relating to the first user.

In addition, according to the present disclosure, there is provided a control method including: judging control content of equipment in accordance with a request from outside; presenting information in accordance with the request from the outside to a first user and making an inquiry to the first user as to approval regarding the judged control content; and controlling the equipment by a processor in accordance with a response to the inquiry and information relating to the first user.

In addition, according to the present disclosure, there is provided a program causing a computer to function as: a judging unit configured to judge control content of equipment in accordance with a request from outside; an inquiry unit configured to present information in accordance with the request from the outside to a first user and make an inquiry to the first user as to approval regarding the control content judged by the judging unit; and an equipment control unit configured to control the equipment in accordance with a response to the inquiry and information relating to the first user.

Advantageous Effects of Invention

As described above, according to the present disclosure, it is possible to control equipment adaptively to a user who gives a response in a scene where a request is made from outside. Note that the effect described here is not necessarily limiting, and any effects described in the present disclosure may be achieved.

BRIEF DESCRIPTION OF DRAWINGS

FIG. 6 is an explanatory diagram illustrating a configuration example of history information 60 according to the embodiment.

MODE(S) FOR CARRYING OUT THE INVENTION

Figure 1:
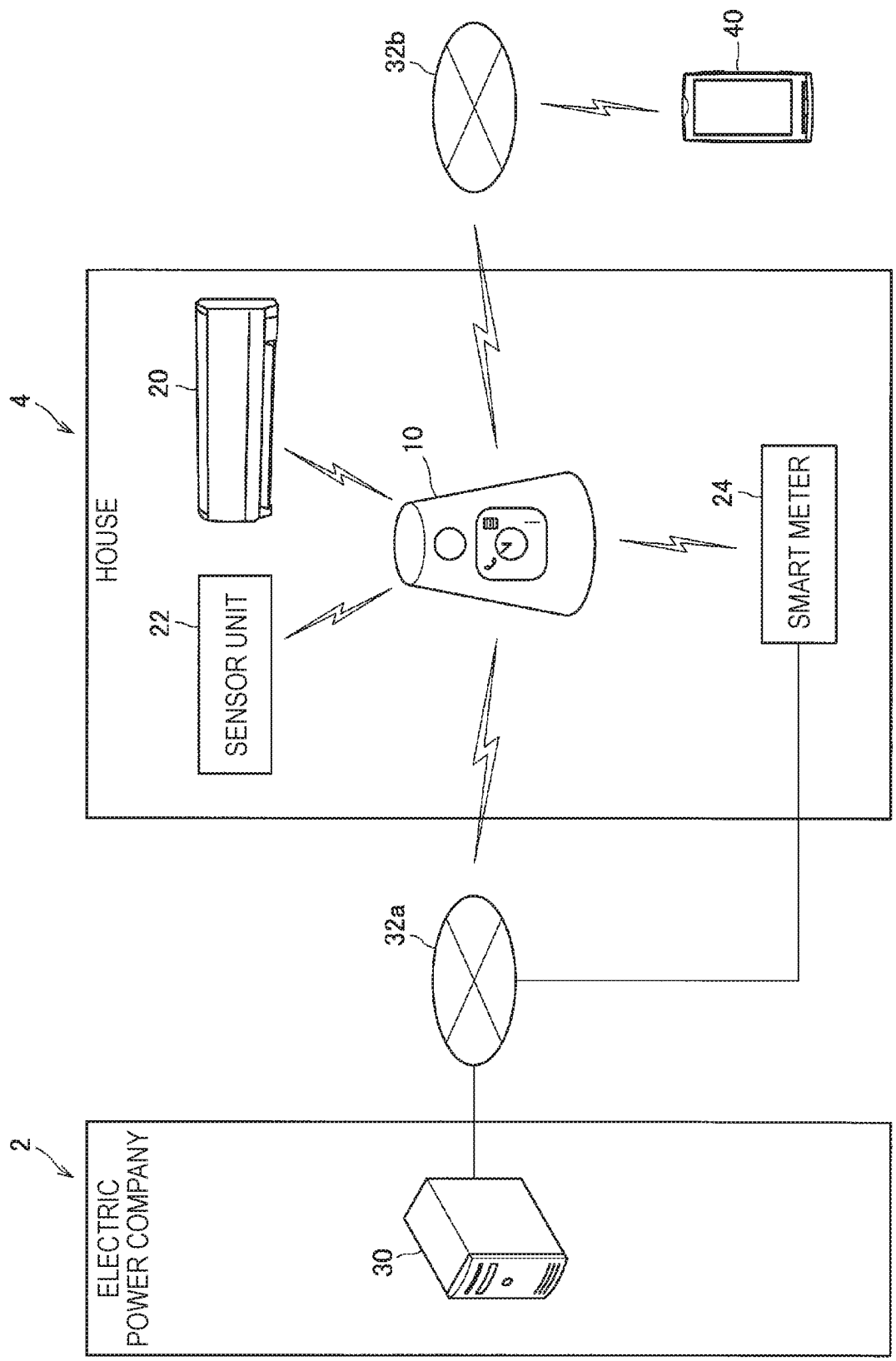
FIG. 1 is an explanatory diagram illustrating a configuration example of a control system according to an embodiment of the present disclosure.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, there are also cases in which a plurality of structural elements that have substantially the same function and structure are distinguished by applying different alphabets after the same reference numerals in the specification and the drawings. For example, a plurality of components that have substantially the same function and structure are distinguished as a device 20a and a device 20b as needed. However, only the same reference numerals are applied in a case in which it is not particularly necessary to distinguish the plurality of respective structural elements that have substantially the same function and structure. For example, the device 20a and the device 20b are simply referred to as a device 20 in a case in which it is not particularly necessary to distinguish them.

Further, the "Mode(s) for Carrying Out the Invention" will be described in the following item order.
1. Configuration of control system
2. Detailed description of embodiment
3. Hardware configuration
4. Modification examples 1. Configuration of Control System 1-1. System Configuration A basic configuration of a control system according to the present embodiment will be described first with reference to FIG. 1. As illustrated in FIG. 1, the control system according to the present embodiment includes a control apparatus 10, equipment 20, a sensor unit 22, a smart meter 24, a server 30, a communication network 32 and a mobile terminal 40.

[1-1-1. Control Apparatus 10]

The control apparatus 10 is an apparatus for controlling operation of one or more equipment 20 provided within a predetermined facility. Here, the predetermined facility is, for example, a house 4 as illustrated in FIG. 1. However, the predetermined facility is not limited to such an example, and may be a store, a factory, an office building or a public facility. Note that, in the following description, an example will be mainly described where the predetermined facility is the house 4.

For example, the control apparatus 10 causes the equipment 20 to start or finish operation or causes the equipment 20 to change setting information such as, for example, a set temperature and set humidity.

Further, the control apparatus 10 can communicate with the equipment 20 and the sensor unit 22 through wireless communication or wired communication. For example, the control apparatus 10 transmits a control signal for controlling the operation of the equipment 20 to the equipment 20. Further, the control apparatus 10 receives a measurement result by the sensor unit 22. Still further, the control apparatus 10 can transmit/receive various kinds of information to/from, for example, the server 30, the mobile terminal 40, or the like, via the communication network 32 which will be described later.

Further, the control apparatus 10 can also control each equipment 20 on the basis of control information input by a user.

The control apparatus 10 is, for example, a portable apparatus. Further, the control apparatus 10 can be used by being disposed on a desk, floor, or the like. For example, the control apparatus 10 can be a dedicated apparatus as illustrated in FIG. 1.

[1-1-2. Equipment 20]

The equipment 20 is predetermined equipment, for example, disposed inside the house 4. For example, the equipment 20 may be an air conditioner, lighting, an air purifier, a water heater, a refrigerator, a television receiver, acoustic equipment, a vacuum cleaner, a window, or the like.

For example, the specific equipment 20 can perform processing of changing a temperature, humidity, illuminance, or the like, inside the house 4. Note that the equipment 20 may be provided in one room in the house 4 or may be provided in a plurality of rooms.

[1-1-3. Sensor Unit 22]

The sensor unit 22 measures various kinds of information, for example, inside the house 4. For example, the sensor unit 22 includes a plurality of types of sensors such as a thermometer, a hygrometer, an illuminance meter, a motion detector and an image sensor (camera). Note that an apparatus may be different for each type of sensor, or a plurality of types of sensors may be included in one apparatus. Further, a specific type of sensor may be integrally configured with the control apparatus 10 or any equipment 20 instead of being configured as an independent apparatus. For example, a thermometer 22a and a hygrometer 22b may be included in an air conditioner 20a.

Note that a plurality of types of sensors included in the sensor unit 22 may be provided in one room in the house 4 or may be provided in a plurality of rooms. Alternatively, a specific type of sensor can be provided outdoors.

[1-1-4. Smart Meter 24]

The smart meter 24 is a meter which digitally measures power consumption in the house 4. Further, the smart meter 24 has a communication function. For example, the smart meter 24 can transmit the measured power consumption to a server 30 of an electric power company 2.

[1-1-5. Mobile Terminal 40]

The mobile terminal 40 is a portable apparatus carried by a user who is a resident of the house 4. For example, the mobile terminal 40 may be a mobile phone such as a smartphone, a tablet terminal, a wristwatch computer, or the like.

[1-1-6. Server 30]

The server 30 is an apparatus for storing information managed by predetermined organization. Here, as illustrated in FIG. 1, the predetermined organization is, for example, the electric power company 2. However, the predetermined organization is not limited to such an example, and may be a government, a local government, waterworks bureau, a gas company, a telecommunications carrier, a service provider, or the like. Further, the predetermined organization may be public organization or private organization. Note that, in the following description, an example will be mainly described where the predetermined organization is the electric power company 2. For example, the server 30 manages customer information relating to customers (users) within a service area of the electric power company 2.

Further, the server 30 transmits a power consumption reduction request to each house 4 on the basis of a predetermined condition. Here, the power consumption reduction request is, for example, "set a set temperature of an air conditioner at 27° C.", "lower power consumption by 200 W", or the like. For example, in the case where current power consumption in the service area of the electric power company 2 becomes equal to or larger than a predetermined value, or in the case where power consumption presumed from weather forecast, or the like, becomes equal to or larger than a predetermined value, the server 30 transmits a power consumption reduction request mail to a user of each house 4.

Figure 2:
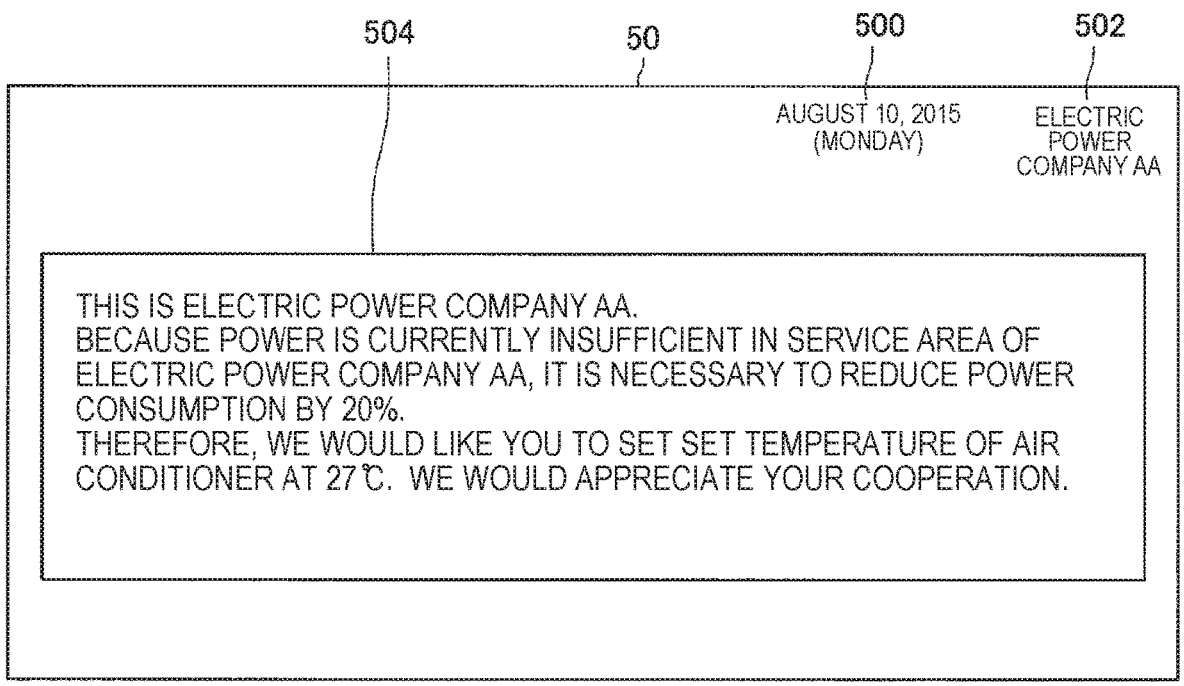
FIG. 2 is an explanatory diagram illustrating an example of a request mail from an electric power company according to the embodiment.

FIG. 2 is an explanatory diagram illustrating an example of the request mail (request mail 50). As illustrated in FIG. 2, the request mail 50 includes, for example, request date and time 500, name of a person who makes a request 502 and content of a request 504. In the example illustrated in FIG. 2, an example is illustrated where the request date and time is "Aug. 10, 2015 (Monday)", the person who makes a request is "Electric power company AA" and the content of the request is "set a set temperature of an air conditioner at 27° C.". Note that, while details will be described later, the request mail 50 may further describe a restriction condition (such as, for example, age) of an approver with respect to the request.

Further, the server 30 can provide a point to a user who has cooperated with the request. For example, in the case where the content of the request is reduction of power consumption, the server 30 may provide more points to a user who more reduces power consumption.

[1-1-7. Communication Network 32]

The communication network 32 is a wired or wireless transmission path of information transmitted from an apparatus connected to the communication network 32. For example, the communication network 32 may include a public network such as a telephone network, the Internet and a satellite communication network, various kinds of local area networks (LAN) including Ethernet (registered trademark), a wide area network (WAN), or the like. Further, the communication network 32 may include a leased line network such as Internet protocol-virtual private network (IP-VPN).

1-3. Organizing of Problems

The configuration of the control system according to the present embodiment has been described above. By the way, even in the case where power consumption approaches an upper limit, if the electric power company 2 restricts power to be supplied to each house 4 only on own judgment of the electric power company 2, or directly controls the equipment 20 inside each house 4, a trouble can occur. For example, in the case where the electric power company 2 restricts power to be supplied to each house 4, there is a risk that, for example, nursing care equipment, or the like, which is being used is stopped, which may affect a health condition of, for example, an elderly person or a patient. Further, in the case where the electric power company 2 stops the air conditioner in each house 4, there is a risk that the temperature inside the house 4 rises, which may also affect a health condition of an elderly person or a patient.

Therefore, in view of the above-described circumstances, the control apparatus 10 according to the present embodiment has been made. The control apparatus 10 can appropriately judge a type of the equipment 20 to be controlled and control content in accordance with a power consumption reduction request from the electric power company 2, make an inquiry to the user as to approval regarding the judging result and control the equipment 20 in accordance with a response to the inquiry and the user who has given the response.

Further, by the control apparatus 10 leaving content of the response as history information, it is possible to prevent occurrence of a trouble, for example, between the electric power company 2 and the user, as to whether or not such a response has been made.

2. Detailed Description of Embodiment 2-1. Configuration

Figure 3:
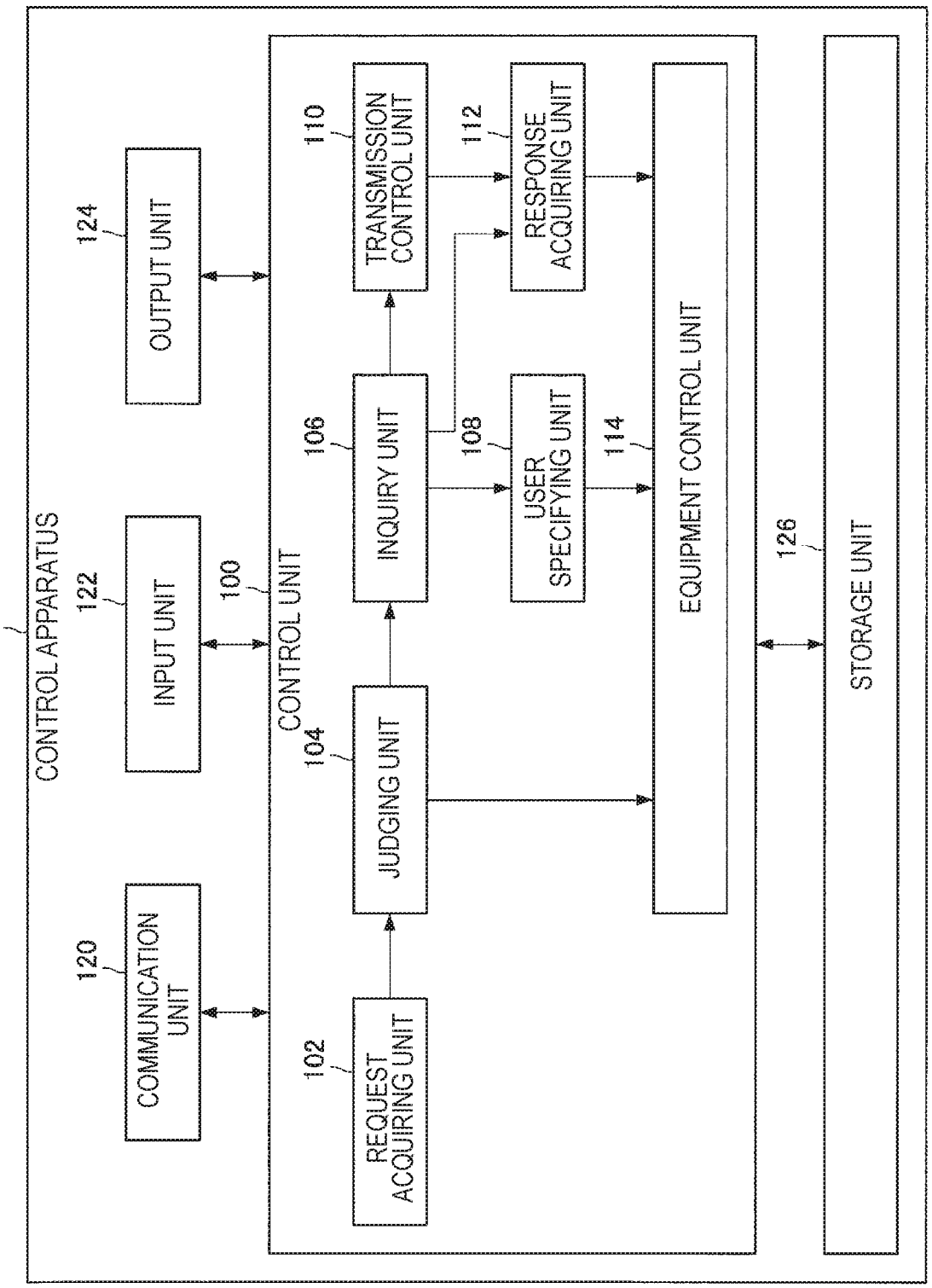
FIG. 3 is a functional block diagram illustrating a configuration example of a control apparatus 10 according to the embodiment.

A configuration of the control apparatus 10 according to the present embodiment will be described in detail next. FIG. 3 is a functional block diagram illustrating the configuration of the control apparatus 10 according to the present embodiment. As illustrated in FIG. 3, the control apparatus 10 includes a control unit 100, a communication unit 120, an input unit 122, an output unit 124 and a storage unit 126.

[2-1-1. Control Unit 100]

The control unit 100 generally controls operation of the control apparatus 10 using hardware such as a central processing unit (CPU) 150 and a random access memory (RAM) 154 which will be described later and which is incorporated into the control apparatus 10. Further, as illustrated in FIG. 3, the control unit 100 includes a request acquiring unit 102, a judging unit 104, an inquiry unit 106, a user specifying unit 108, a transmission control unit 110, a response acquiring unit 112 and an equipment control unit 114.

[2-1-2. Request Acquiring Unit 102]

The request acquiring unit 102 acquires various kinds of requests from the electric power company 2, such as, for example, a power consumption reduction request, received from the server 30.

[2-1-3. Judging Unit 104]

The judging unit 104 judges a type of the equipment 20 to be controlled or judges control content with respect to the equipment 20 in accordance with the request acquired by the request acquiring unit 102. For example, the judging unit 104 first judges the equipment 20 to be controlled among a plurality of types of equipment 20 provided inside the house 4 in accordance with the acquired request and, then, judges control content with respect to the equipment 20 to be controlled. As an example, the judging unit 104 judges to stop one of the equipment 20 which is currently being activated or switch a mode to a power saving mode on the basis of the acquired request and a predetermined judging condition.

Here, the predetermined judging condition can be, for example, a magnitude of power which is currently being consumed by the equipment 20. For example, the judging unit 104 judges to preferentially stop equipment 20 which consumes more power or preferentially switch the mode to the power saving mode for equipment 20 which consumes more power.

Alternatively, the predetermined judging condition can be likelihood of affecting the health of the user. For example, the judging unit 104 judges to preferentially stop equipment 20 which is less likely to affect the health of the user or preferentially switch the mode to the power saving mode for equipment 20 which is less likely to affect the health of the user. Further, the judging unit 104 may judge not to stop equipment 20 which is highly likely to affect the health of the user and not to switch the mode to the power saving mode for equipment 20 which is highly likely to affect the health of the user. Here, a specific example of the equipment 20 which is less likely to affect the health can include a television receiver, acoustic equipment, or the like. Further, a specific example of the equipment 20 which is highly likely to affect the health can include nursing care equipment, a cardiac pacemaker, an air conditioner, or the like.

Alternatively, the predetermined judging condition can be setting information by the user. For example, the judging unit 104 judges to preferentially stop equipment 20 with higher priority which is set in advance by the user or preferentially switch the mode to the power saving mode for equipment 20 with higher priority which is set in advance by the user.

Alternatively, the predetermined judging condition can be whether or not there is alternative equipment 20 or method. For example, in the case where the set temperature of an operating air conditioner is "27° C.", in the case where it is possible to maintain the temperature of a room at approximately "27° C." by opening a window even if the air conditioner is stopped, the judging unit 104 judges to stop the air conditioner and open the window. Note that, in the case where the window cannot be automatically open or closed, the judging unit 104 can cause the output unit 124 to output sound or display which encourages the user to open the window.

Alternatively, the predetermined judging condition can be content of the acquired request. For example, in the case where a request of "set the temperature of the air conditioner at 27° C." is acquired, the judging unit 104 first confirms whether or not both conditions that the air conditioner is currently operating and that the set temperature is lower than 27° C. are satisfied. Then, in the case where the both conditions are satisfied, the judging unit 104 judges the air conditioner as the equipment 20 to be controlled and judges to control the air conditioner so that the set temperature is set at "27° C.".

[2-1-4. Inquiry Unit 106]

The inquiry unit 106 presents content of the request acquired by the request acquiring unit 102 to the user and makes an inquiry to the user as to approval regarding the judging result by the judging unit 104. For example, the inquiry unit 106 may cause the output unit 124 to output the content of the request acquired by the request acquiring unit 102 through sound or may cause the output unit 124 to display the content on a display screen (of the output unit 124). Alternatively, the inquiry unit 106 may control, for example, a printer, or the like, and cause the printer to print the content of the acquired request on paper.

For example, the inquiry unit 106 first causes the output unit 124 to output notification of content of the request acquired by the request acquiring unit 102 and an inquiry as to approval regarding the judging result by the judging unit 104 through sound only once. Then, the inquiry unit 106 causes the content of the request and the inquiry as to the approval regarding the judging result by the judging unit 104 to be displayed on the display screen.

Figure 4:
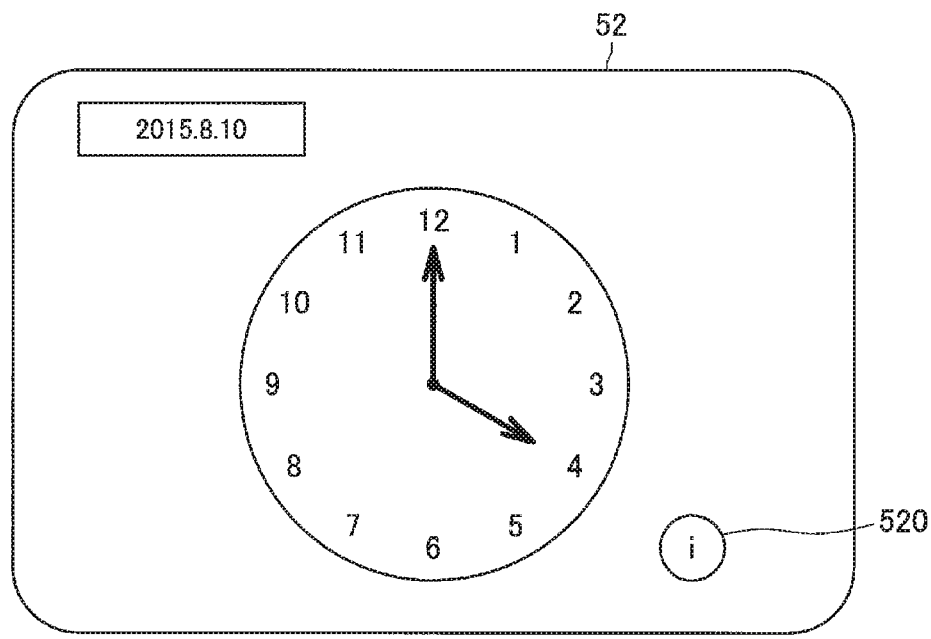
FIG. 4 is an explanatory diagram illustrating a display example of a display screen according to the embodiment.

Here, the above-described content will be described in more detail with reference to FIG. 4. FIG. 4 is an explanatory diagram illustrating a display example (display screen 52) of the display screen (displayed by the output unit 124). For example, when the judgement by the judging unit 104 is finished, the inquiry unit 106 causes a notification button 520 to be displayed on the display screen 52. The notification button 520 is a user interface (UI) for causing, for example, the content of the acquired request or the judging result by the judging unit 104 to be displayed.

Figure 5:
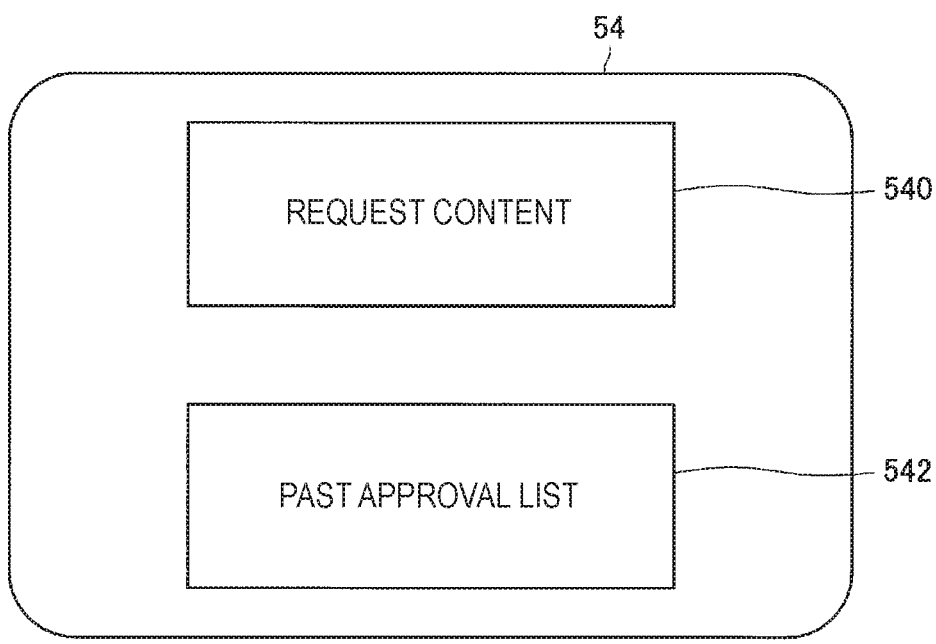
FIG. 5 is an explanatory diagram illustrating a display example of a display screen upon selection of a notification button according to the embodiment.

For example, in the case where the notification button 520 is selected by, for example, being touched by the user, the inquiry unit 106 causes a selection screen 54 as illustrated in, for example, FIG. 5 to be displayed. The selection screen 54 includes, for example, a request content display button 540 and a past approval list button 542. Here, the request content display button 540 is a selection button for causing the content of the request acquired by the request acquiring unit 102 to be displayed on the display screen. For example, if the request content display button 540 is selected by the user, the inquiry unit 106 may cause an e-mail received from the server 30 as illustrated in FIG. 2 to be displayed on the display screen. Further, the past approval list button 542 is a selection button for displaying a list of history information regarding approval given by the user in the past. Note, as will be described later, the history information can be stored in, for example, the storage unit 126. Alternatively, the history information may be stored in other apparatuses (illustration will be omitted) connected to the communication network 32.

(2-1-4-1. Modification Examples)

By the way, in the case where a user who has given a response to the inquiry (hereinafter, also referred to as a responding user) is different from a user who has operated the equipment 20 which is a target of the inquiry last (hereinafter, also referred to as an operating user), it is assumed that a trouble regarding content of the response made by the responding user may occur later between the responding user and the operating user. Therefore, as a modification example, in the case where the responding user is different from the operating user, the inquiry unit 106 can further make an inquiry to the operating user. For example, the inquiry unit 106 may make an inquiry to the operating user as to whether or not he/she approves a response given by the responding user or may make an inquiry to the operating user as to approval regarding the judging result itself by the judging unit 104.

Note that, in this event, the inquiry unit 106 may further confirm to the responding user as to making an inquiry to the operating user. For example, the inquiry unit 106 confirms to the responding user as to "because Taro-san made an entry, is it OK if we confirm to Taro-san?", or the like. Note that the responding user is an example of a first user in the present disclosure, and the operating user is an example of a second user in the present disclosure.

According to this modification example, because, in the case where the responding user is different from the operating user, confirmation is made to the operating user, it is possible to prevent occurrence of a trouble later as to content of the response given by the responding user between the responding user and the operating user.

[2-1-5. User Specifying Unit 108]

The user specifying unit 108 specifies a user who has given a response to the inquiry by the inquiry unit 106. For example, the user specifying unit 108 specifies a user who gives a response to the inquiry by the inquiry unit 106 on the basis of recognition of a captured image of the user. As an example, the user specifying unit 108 first acquires a captured image of the user who gives a response, which is taken with the sensor unit 22. Then, the user specifying unit 108 specifies the user who gives a response on the basis of recognition of a face region included in the acquired captured image and information regarding a composition of residents of the house 4. Note that the information regarding the composition of the residents of the house 4 can be stored in the storage unit 126 in advance.

[2-1-6. Transmission Control Unit 110]

The transmission control unit 110 controls transmission of various kinds of information to other apparatuses. For example, in the case where a predetermined transfer condition is satisfied, the transmission control unit 110 causes the communication unit 120 to transmit information regarding the inquiry by the inquiry unit 106 to the mobile terminal 40. Here, the predetermined transfer condition may be, for example, elapse of predetermined time since the inquiry has been made by the inquiry unit 106 or may be registration of setting for transferring the inquiry by the inquiry unit 106 to the mobile terminal 40 in, for example, the storage unit 126. According to this control example, for example, even if the user is out, the user can promptly respond to the request from the electric power company 2.

[2-1-7. Response Acquiring Unit 112]
(2-1-7-1. Acquisition of Response)

The response acquiring unit 112 acquires the response of the user to the inquiry by the inquiry unit 106. For example, the response acquiring unit 112 acquires the response on the basis of an analysis result of sound (of the response) emitted after the inquiry is made, text of the response input by the user, an option selected by the user among a select list of responses displayed on the display screen, or the like. Note that, in the case where sound of the response is input, the response acquiring unit 112 recognizes the input sound and, then, performs semantic analysis on the recognition result. Here, the response can be, for example, "Yes", "No", "OK", "NG", or the like.

Alternatively, in the case where the information regarding the inquiry by the inquiry unit 106 is transferred to the mobile terminal 40, the response acquiring unit 112 can acquire the response to the inquiry by receiving the response from the mobile terminal 40.

Further, as in the modification example described in section 2-1-4-1, in the case where an inquiry is further made to the operating user by the inquiry unit 106, the response acquiring unit 112 can acquire combination of the response by the responding user and the response by the operating user as the response to the inquiry. Alternatively, the response acquiring unit 112 can acquire only the response by the operating user as the response to the inquiry.

(2-1-7-2. Recording of Response)

Further, the response acquiring unit 112 stores the acquired response in, for example, the storage unit 126 as history information. For example, the response acquiring unit 112 stores recorded data of sound of the response or moving image data obtained by recording a video of the user upon response in the storage unit 126 as part of the history information. Note that, as a modification example, the response acquiring unit 112 can also cause the communication unit 120 to transmit the acquired response to other apparatuses connected to, for example, the communication network 32 (instead of storing the acquired response in the storage unit 126).

Here, an example of the history information (history information 60) will be described with reference to FIG. 6. As illustrated in FIG. 6, the history information 60 includes, for example, date and time 600, content of a request 602, presence of absence of a response 604, respondent information 606, content of a response 608, a method of response 610, or the like. Here, in the date and time 600, date and time at which the inquiry has been made (or date and time at which the response has been made) is recorded. Further, in the content of a request 602, content of the request from the electric power company 2 corresponding to the inquiry is recorded. Still further, in the presence of absence of a response 604, whether or not a response to the inquiry has been acquired is recorded. For example, in the case where predetermined time has elapsed since the response has not been made after the inquiry has been made, "No" is recorded. Further, in the respondent information 606, identification information such as, for example, name of the user who has given the response is recorded. Still further, in the content of a response 608, the content of the response is recorded. Further, in the method of response 610, a method in which the response has been made is recorded.

[2-1-8. Equipment Control Unit 114]

The equipment control unit 114 controls the target equipment 20 in accordance with the acquisition result of the response by the response acquiring unit 112 and control content with respect to the equipment 20, judged by the judging unit 104. For example, in the case where the response has not been acquired or in the case where a response indicating that "not approved" has been acquired, the equipment control unit 114 does not execute control content judged by the judging unit 104 on the target equipment 20.

Further, in the case where a response indicating that "approved" has been acquired, the equipment control unit 114 controls the equipment 20 in accordance with whether or not the user who has given the response has authority of response. For example, in the case where the user who has given the response has authority of response, the equipment control unit 114 executes the control content judged by the judging unit 104 on the target equipment 20. Further, in the case where the user who has given the response does not have authority of response, the equipment control unit 114 does not execute the control content judged by the judging unit 104 on the equipment 20.

Here, the authority of response is, for example, that the age of the user who gives a response falls within a predetermined range such as, for example, "18 years old and over and under the 75 years old". Note that the information regarding the authority of response may be registered in, for example, the storage unit 126. Alternatively, as described above, in the case where the restriction condition for the respondent is described in the request from the electric power company 2, the authority of response can be determined in accordance with the restriction condition.

[2-1-9. Communication Unit 120]

The communication unit 120 transmits/receives information to/from other apparatuses which can communicate with the control apparatus 10. For example, the communication unit 120 receives a measurement result from the sensor unit 22. Further, the communication unit 120 receives a power consumption reduction request from the server 30. Still further, the communication unit 120 transmits a control signal to the target equipment 20 in accordance with control by the equipment control unit 114.

[2-1-10. Input Unit 122]

The input unit 122 accepts input by the user. For example, the input unit 122 accepts sound emitted by the user. Further, the input unit 122 includes an operating unit (illustration will be omitted) and accepts operation with respect to the operating unit. For example, the operating unit can include a touch panel, a button, a switch, a dial, or the like.

[2-1-11. Output Unit 124]

The output unit 124 outputs sound or displays a display screen in accordance with control by, for example, the inquiry unit 106, or the like.

[2-1-12. Storage Unit 126]

The storage unit 126 stores various kinds of data and various kinds of software. For example, the storage unit 126 stores history information regarding a response by the user.

2-2. Operation

Figure 7:
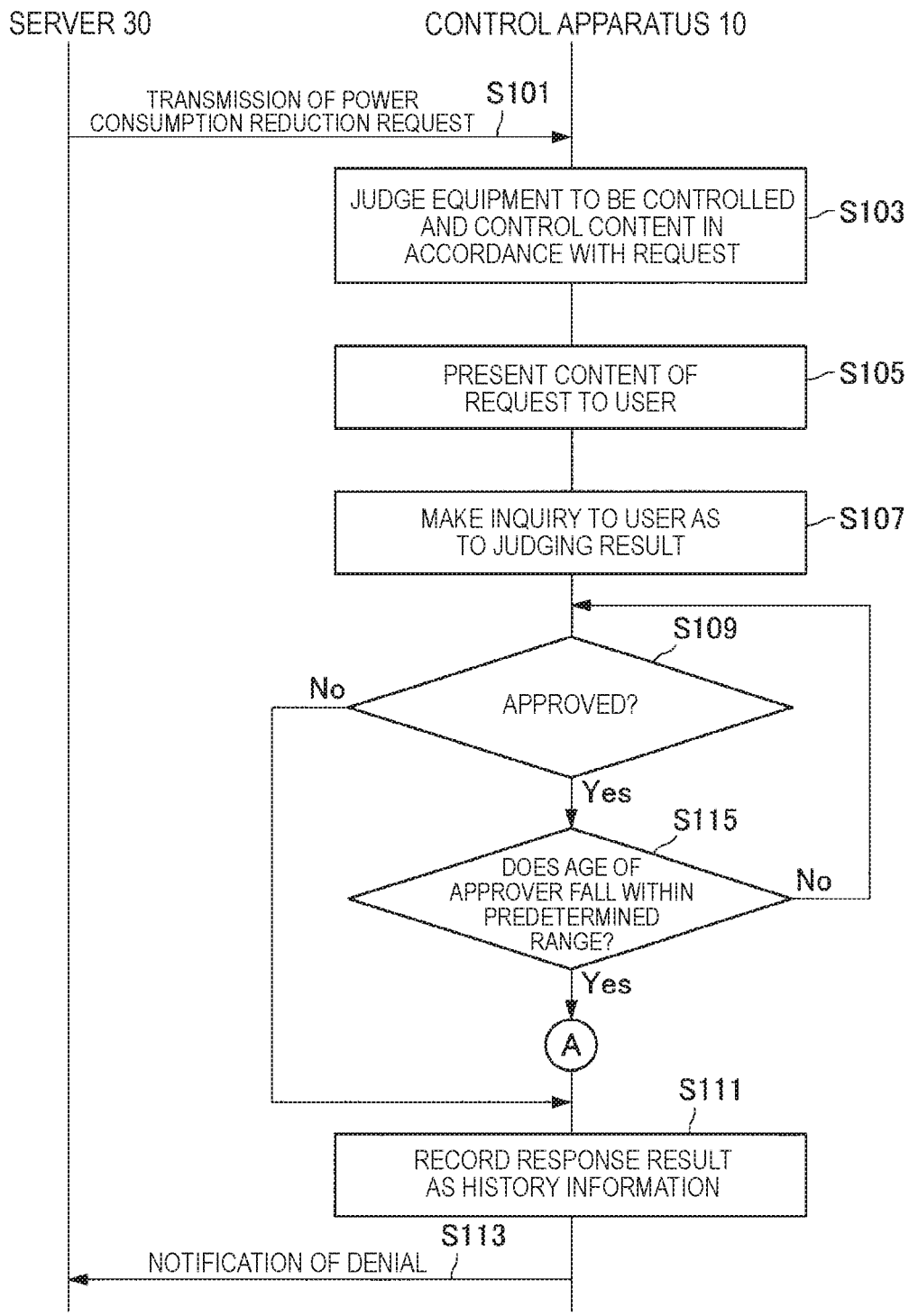
FIG. 7 is a sequence diagram illustrating part of an operation example according to the embodiment.

The configuration according to the present embodiment has been described above. An operation example according to the present embodiment will be described next with reference to FIG. 7 and FIG. 8. FIG. 7 is a sequence diagram illustrating part of the operation example according to the present embodiment. As illustrated in FIG. 7, first, the server 30 transmits a power consumption reduction request to the control apparatus 10 of each house 4 when, for example, electric power shortage occurs, or the like (S101).

Then, the judging unit 104 of the control apparatus 10 judges a type of the equipment 20 to be controlled and control content with respect to the equipment 20 in accordance with the request received in S101 (S103).

Subsequently, the inquiry unit 106 presents content of the request received in S101 to the user (S105). For example, the inquiry unit 106 causes the content of the request to be output through sound or to be displayed on the display screen.

Subsequently, the inquiry unit 106 makes an inquiry to the user as to approval regarding the judging result in S103 (S107).

Then, the control unit 100 stands by until a response to the inquiry is given by the user (S109). In the case where predetermined time has elapsed without a response being made, or in the case where a response indicating "not approved" has been given by the user (S109: No), first, the response acquiring unit 112 stores a result of the response in the storage unit 126 as the history information (S111). Then, the communication unit 120 transmits notification of denial with respect to the request received in S101 to the server 30 in accordance with control by the transmission control unit 110 (S113). Then, the operation is finished.

On the other hand, in the case where a response indicating "approved" has been made by the user (S109: Yes), the user specifying unit 108 first acquires a captured image of the user who has given the response, which is taken with the sensor unit 22. Then, the user specifying unit 108 specifies the user who has given the response on the basis of recognition of the acquired captured image. In the case where the age of the specified user is out of the predetermined range (S115: No), the control unit 100 regards the acquired response as invalid and performs the processing in S109 again.

Figure 8:
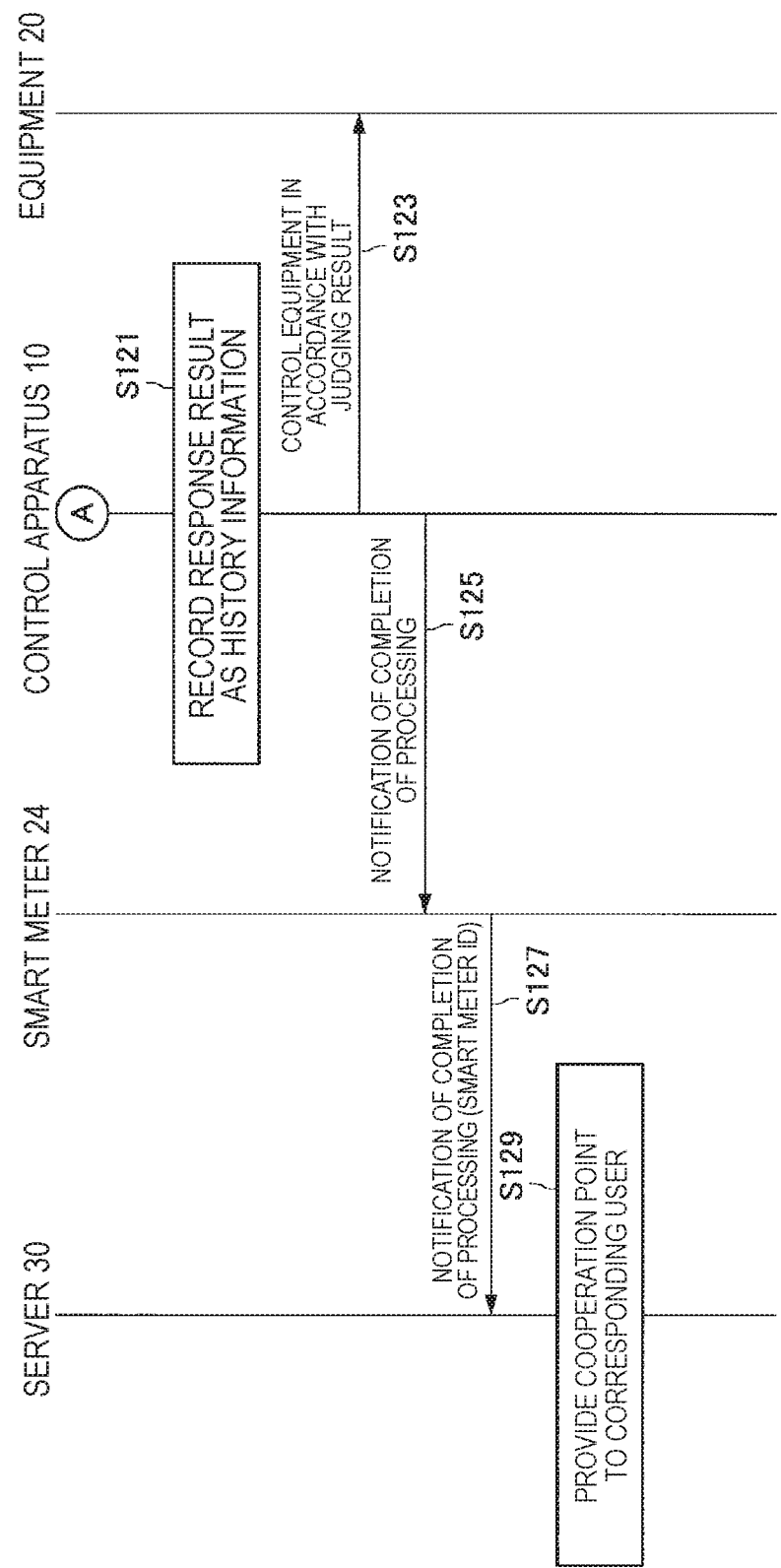
FIG. 8 is a sequence diagram illustrating part of the operation example according to the embodiment.

Here, an operation example in the case where the age of the specified user falls within the predetermined range (S115: Yes) will be described with reference to FIG. 8. As illustrated in FIG. 8, first, the response acquiring unit 112 stores the acquired response in the storage unit 126 as the history information (S121).

Subsequently, the equipment control unit 114 controls the target equipment 20 in accordance with the control content judged in S103 (S123).

Subsequently, the communication unit 120 transmits notification of completion of control of the equipment 20 to the smart meter 24 in accordance with control by the transmission control unit 110 (S125).

Then, the smart meter 24 transmits notification of completion of the processing including an ID of the smart meter 24 to the server 30 (S127).

Then, the server 30 provides a cooperation point in association with the corresponding user (S129).

[2-3-1. Modification Examples]

Note that the operation according to the present embodiment is not limited to the above-described examples. For example, the processing in S113, that is, processing of transmitting notification of denial to the server 30 may be omitted. Further, in S115, in the case where the age of the specified user is out of the predetermined range (S115: No), the control apparatus 10 may deny the request received in S101. More specifically, in this case, the processing of the control apparatus 10 may transition to S111 instead of transitioning to S109.

2-3. Effects

[2-3-1. Effect 1]

As described above, the control apparatus 10 according to the present embodiment judges a type of the equipment 20 to be controlled and control content in accordance with a power consumption reduction request from the electric power company 2 and presents content of the reduction request to the user and makes an inquiry to the user as to approval regarding the judging result, and controls the target equipment 20 in accordance with content of the response to the inquiry and judged control content. Therefore, it is possible to execute appropriate control content on the equipment 20 while reflecting user's intention.

[2-3-2. Effect 2]

Further, it is possible to perform setting so that, in the case where the user who has given a response indicating "approved" does not have authority of response, the control apparatus 10 does not execute the judged control content on the equipment 20. Therefore, it is possible to prevent processing which is not intended by the user from being executed before the user who has authority of response knows. For example, in the case where the parents are not at home, even if a child gives a response indicating "approved", it is possible to prevent control on the equipment 20 based on a request from the electric power company 2 from being executed.

[2-3-3. Effect 3]

Further, the control apparatus 10 transmits content of the response of the user to the inquiry to other apparatuses or store the content of the response as the history information. By this means, because there remains evidence of the response, for example, it is possible to prevent occurrence of a trouble between the electric power company 2 and the user, as to whether or not such a response has been made.

3. Hardware Configuration

Figure 9:
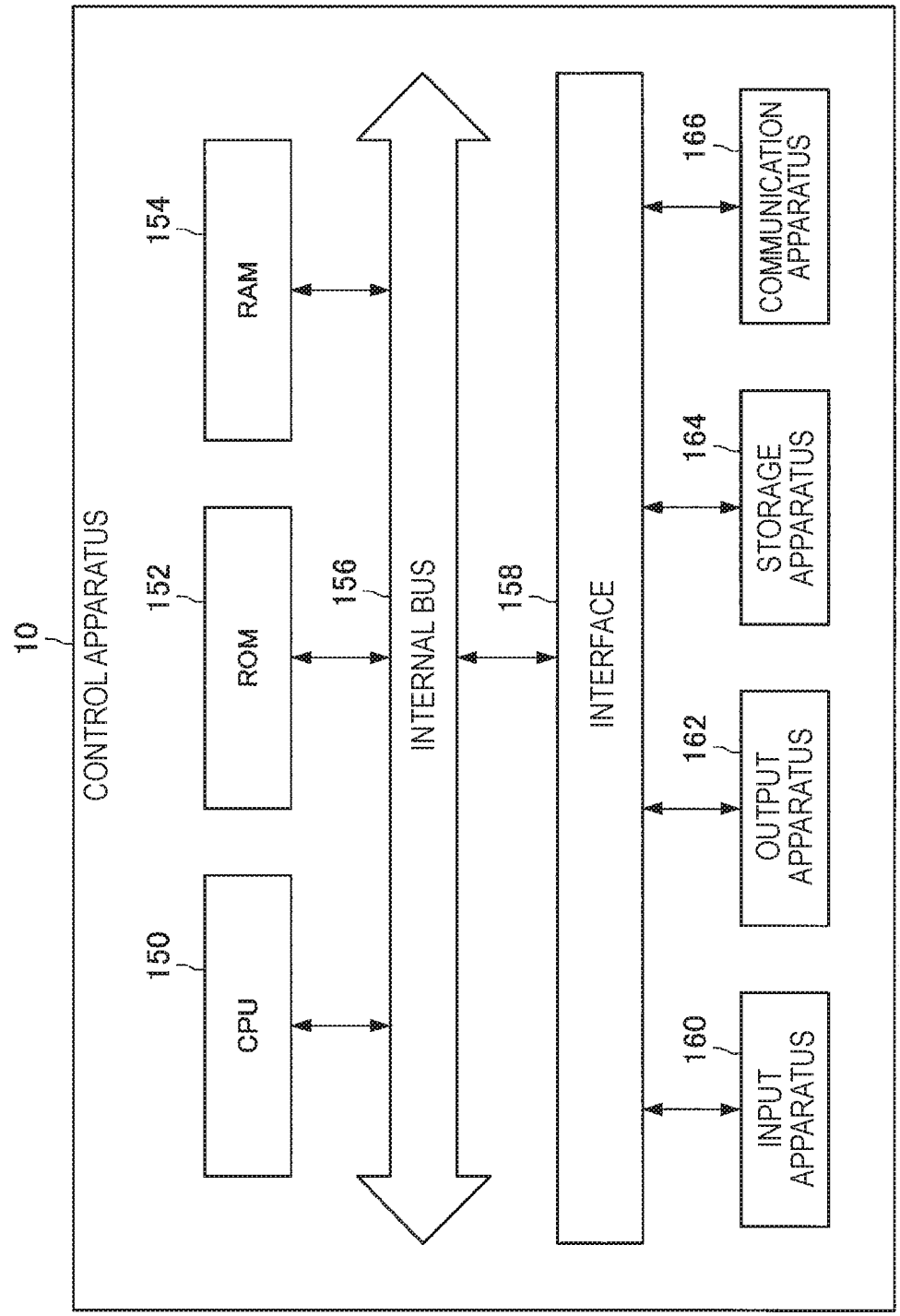
FIG. 9 is an explanatory diagram illustrating a hardware configuration of the control apparatus 10 according to the embodiment.

A hardware configuration of the control apparatus 10 according to the present embodiment will be described next with reference to FIG. 9. As illustrated in FIG. 9, the control apparatus 10 include a CPU 150, a read only memory (ROM) 152, a RAM 154, an internal bus 156, an interface 158, an input apparatus 160, an output apparatus 162, a storage apparatus 164 and a communication apparatus 166.

The CPU 150, which functions as an arithmetic processing unit and a control apparatus, controls the whole operation within the control apparatus 10 in accordance with various kinds of programs. Further, the CPU 150 implements a function of the control unit 100 at the control apparatus 10. Note that the CPU 150 includes a processor such as a microprocessor.

The ROM 152 stores programs, control data such as an operation parameter, or the like, to be used by the CPU 150.

The RAM 154 temporarily stores, for example, programs to be executed by the CPU 150.

The internal bus 156 includes a CPU bus, or the like. The internal bus 156 interconnects the CPU 150, the ROM 152 and the RAM 154.

The interface 158 connects the input apparatus 160, the output apparatus 162, the storage apparatus 164 and the communication apparatus 166 to the internal bus 156.

The input apparatus 160 includes, for example, input means for allowing the user to input information, such as a touch panel, a button, a switch, a dial and a microphone, an input control circuit which generates an input signal on the basis of input by the user and outputs the input signal to the CPU 150, or the like.

The output apparatus 162 includes a display apparatus such as, for example, a liquid crystal display (LCD) apparatus, an organic light emitting diode (OLED) apparatus and a lamp. Further, the output apparatus 162 includes a sound output apparatus such as a speaker.

The storage apparatus 164 is an apparatus for data storage, which functions as the storage unit 126. The storage apparatus 164 includes, for example, a storage medium, a recording apparatus which records data in the storage medium, a readout apparatus which reads out data from the storage medium, a deletion apparatus which deletes data recorded in the storage medium, or the like.

The communication apparatus 166 is a communication interface including a communication device, or the like, for connecting to, for example, the communication network 32, or the like. Further, the communication apparatus 166 may be a communication apparatus supporting a wireless LAN, a communication apparatus supporting long term evolution (LTE) or a wired communication apparatus which performs communication in a wired manner. The communication apparatus 166 functions as the communication unit 120.

4. Modification Examples

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

4-1. Modification Example 1

For example, while, in the above-described embodiment, an application example has been mainly described in a scene in which the electric power company 2 transmits a power consumption reduction request to each house 4, the present disclosure is not limited to such an example. For example, the present embodiment can be similarly applied to a scene in which, as a safeguard against the seasonal flu, public institution such as the government transmits a request for increasing humidity inside the room to each house 4. Alternatively, the present embodiment can be similarly applied to a scene in which the local government, or the like, transmits a heatstroke alarm for elderly people to each house 4, a scene in which waterworks bureau transmits a request for water saving to each house 4, or the like.

Further, while, in the above-described embodiment, an example has been described where the control apparatus 10 controls the equipment 20 inside the house 4 in accordance with a request from predetermined organization, the present disclosure is not limited to such an example. For example, the control apparatus 10 can control the equipment 20 inside the house 4 in accordance with a request from a family member who lives separately. For example, in the case where a request such as "turn on the air conditioner at the house of the grandmother (=target user)" is transmitted from a family member who lives separately, the control apparatus 10 can control the equipment 20 inside the house 4 of the target user.

4-2. Modification Example 2

Figure 10:
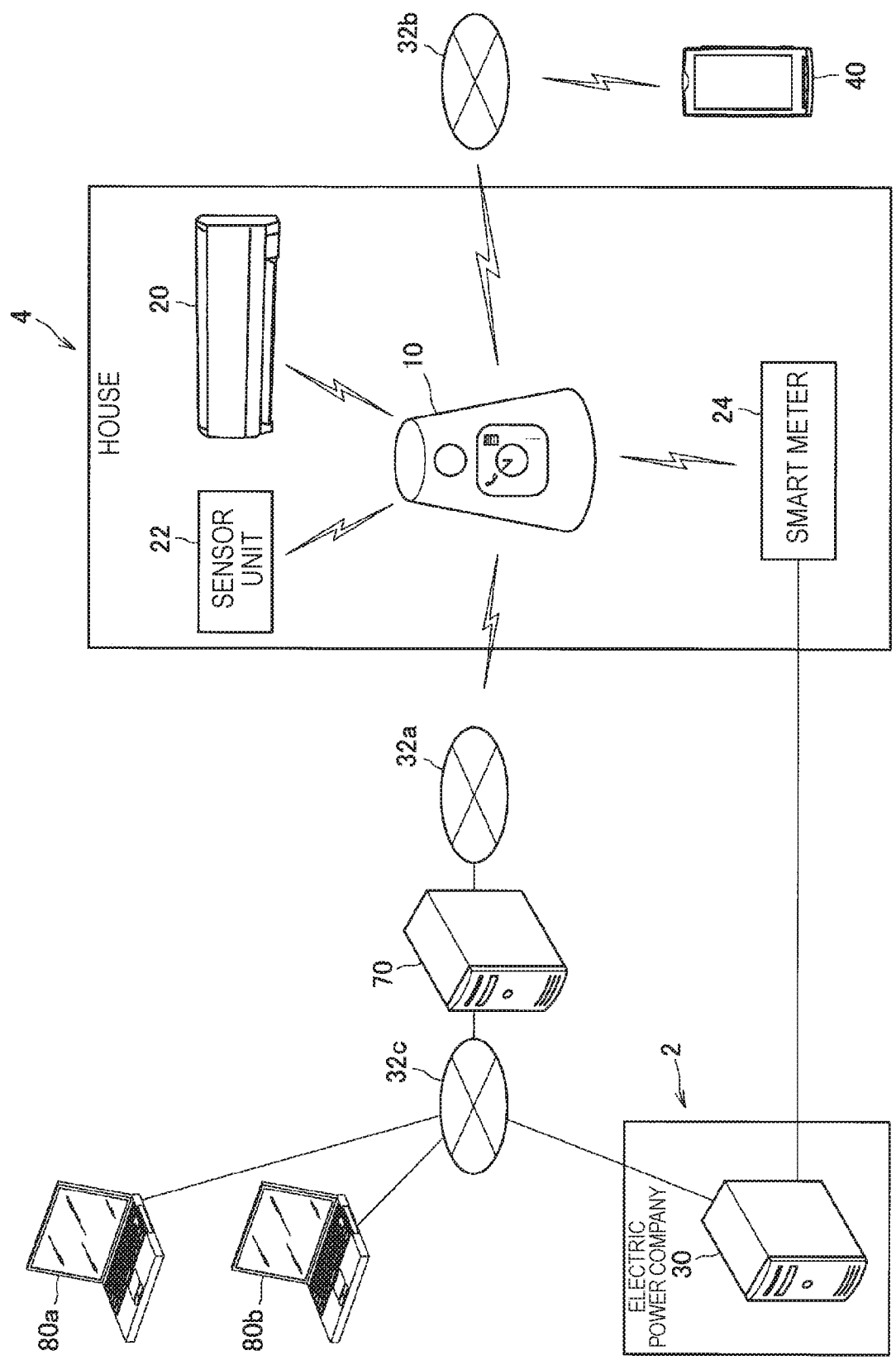
FIG. 10 is an explanatory diagram illustrating a configuration example of a control system according to a modification example of the present disclosure.

Further, the configuration of the control system according to the present embodiment is not limited to the example illustrated in FIG. 1, and, may be, for example, a configuration as illustrated in FIG. 10. As illustrated in FIG. 10, the control system according to the modification example 2 further includes a relay server 70 and a plurality of information processing terminals 80 compared to the example illustrated in FIG. 1. The server 30 and the relay server 70, and each information processing terminal 80 and the relay server 70 are respectively connected via, for example, a communication network 32c.

Here, the information processing terminal 80 is, for example, a terminal 80a used by a family member who lives separately from the target user, a terminal 80b for remote control, or the like.

Further, the relay server 70 is, for example, an apparatus for relaying a request issued from the server 30 or a request issued from each information processing terminal 80 to the control apparatus 10 disposed at the house 4 of the target user on the basis of an instruction from predetermined organization such as the electric power company 2, a family member who lives separately from the target user, or the like. Note that the relay server 70 can be an example of the storage apparatus in the present disclosure.

In this modification example, the request from the server 30 to the target user and the request from each information processing terminal 80 are transmitted to the control apparatus 10 (disposed at the house 4 of the target user) via the relay server 70. Further, (the response acquiring unit 112 of) the control apparatus 10 may transmit the acquired response to the relay server 70. Then, in this case, the relay server 70 can store the received response. Note that other content of the processing is substantially similar to that in the above-described embodiment.

4-3. Modification Example 3

Further, while, in the above-described embodiment, an example has been described where the control apparatus 10 is a dedicated apparatus as illustrated in FIG. 1, the present disclosure is not limited to such an example. For example, the control apparatus 10 may be a mobile phone such as a smartphone, a tablet terminal, a personal computer (PC), a tabletop computer, game machine, or the like. Alternatively, the control apparatus 10 may be a wearable apparatus such as a head mount display and a wristwatch computer.

In addition, according to the aforementioned embodiments, it is also possible to provide a computer program for causing the hardware such as the CPU 150, the ROM 152, and the RAM 154 to exhibit functions that are equivalent to those of the respective components in the control apparatus 10 according to the aforementioned embodiments. In addition, a recording medium having the computer program recorded thereon is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A control apparatus including:

a judging unit configured to judge control content of equipment in accordance with a request from outside;

an inquiry unit configured to present information in accordance with the request from the outside to a first user and make an inquiry to the first user as to approval regarding the control content judged by the judging unit; and an equipment control unit configured to control the equipment in accordance with a response to the inquiry and information relating to the first user.

(2)

The control apparatus according to (1), further including:

a transmission control unit configured to cause a communication unit to transmit the response to the inquiry to a storage apparatus, in which the storage apparatus stores the response to the inquiry as history information.

(3)

The control apparatus according to (1), further including:

a storage unit configured to store the response to the inquiry as history information.

(4)

The control apparatus according to (2) or (3), in which the history information includes content of the response and information regarding date and time of the response.

(5)

The control apparatus according to (4), in which the history information further includes identification information regarding the first user.

(6)

The control apparatus according to any one of (1) to (5), in which the equipment control unit controls the equipment further in accordance with the control content judged by the judging unit.

(7)

The control apparatus according to (6), in which the information relating to the first user includes information indicating whether or not the first user has authority of response, and in a case where a response to the inquiry is made by the first user, the equipment control unit controls the equipment in accordance with whether or not the first user has authority of response.

(8)

The control apparatus according to (7), in which, in a case where the first user has the authority of response, the equipment control unit executes the control content judged by the judging unit on the equipment, and in a case where the first user does not have the authority of response, the equipment control unit does not execute the control content judged by the judging unit on the equipment.

(9)

The control apparatus according to (7) or (8), in which, in a case where age of the first user falls within a predetermined range, the first user has the authority of response.

(10)

The control apparatus according to any one of (7) to (9), further including:

a user specifying unit configured to acquire a captured image of the first user and specifies the first user on a basis of recognition of the captured image of the first user.

(11)

The control apparatus according to any one of (6) to (10), in which the judging unit judges equipment to be controlled among a plurality of types of provided equipment in accordance with the request from the outside and judges control content with respect to the equipment to be controlled, and the equipment control unit executes the control content judged by the judging unit on the equipment to be controlled.

(12)

The control apparatus according to any one of (1) to (11), in which, in a case where a response to the inquiry is made by the first user, and a second user who controls the equipment last is different from the first user, the inquiry unit further makes an inquiry to the second user as to approval regarding the response by the first user, and the equipment control unit controls the equipment further in accordance with a response by the second user.

(13)

The control apparatus according to any one of (1) to (11), in which, in a case where a response to the inquiry is made by the first user, and a second user who controls the equipment last is different from the first user, the inquiry unit further makes an inquiry to the second user as to approval regarding the control content judged by the judging unit, and the equipment control unit controls the equipment in accordance with a response by the second user and the judged control content.

(14)

The control apparatus according to any one of (1) to (13), further including:

a transmission control unit configured to cause a communication unit to transmit an inquiry by the inquiry unit to a mobile terminal in a case where a predetermined condition is satisfied, in which the equipment control unit controls the equipment in accordance with a response to the inquiry, the response being received from the mobile terminal.

(15)

The control apparatus according to (14), in which the predetermined condition is elapse of predetermined time since an inquiry has been made by the inquiry unit.

(16)

The control apparatus according to (14) or (15), in which the transmission control unit further causes the communication unit to transmit a response to the inquiry to a storage apparatus, the inquiry being received from the mobile terminal.

(17)

The control apparatus according to any one of (1) to (16), in which the request from the outside includes information indicating a condition for a user who is able to approve the request.

(18)

The control apparatus according to any one of (1) to (17), in which the inquiry unit makes an inquiry to the first user through sound.

(19)

A control method including:

judging control content of equipment in accordance with a request from outside;

presenting information in accordance with the request from the outside to a first user and making an inquiry to the first user as to approval regarding the judged control content; and controlling the equipment by a processor in accordance with a response to the inquiry and information relating to the first user.

(20)

A program causing a computer to function as:

a judging unit configured to judge control content of equipment in accordance with a request from outside;

an inquiry unit configured to present information in accordance with the request from the outside to a first user and make an inquiry to the first user as to approval regarding the control content judged by the judging unit; and an equipment control unit configured to control the equipment in accordance with a response to the inquiry and information relating to the first user.

REFERENCE SIGNS LIST 10 control apparatus
20 equipment
22 sensor unit
24 smart meter
30 server
32 communication network
40 mobile terminal
70 relay server
80 information processing terminal
100 control unit
102 request acquiring unit
104 judging unit
106 inquiry unit
108 user specifying unit
110 transmission control unit
112 response acquiring unit
114 equipment control unit
120 communication unit
122 input unit
124 output unit
126 storage unit

The invention claimed is:

1. A control apparatus, comprising:
   circuitry configured to:
      receive a request from an external apparatus;
      identify an equipment to be controlled from a plurality of equipment based on the received request;
      determine control content of the identified equipment based on a specific condition and the received request;
      output, based on the received request, information to a first user,
         wherein the information is output to make an inquiry to the first user for approval regarding the determined control content of the identified equipment; and
      control the identified equipment, based on a result associated with a response to the inquiry and authority information associated with the first user; and
   a storage apparatus configured to store the result associated with the response to the inquiry, where the stored result is a specific result when the response to the inquiry is not received for a time period after the inquiry.

2. The control apparatus according to claim 1, wherein:
   the circuitry is further configured to cause a communication circuit to transmit the result associated with the response to the inquiry to the storage apparatus, and the storage apparatus is further configured to store the result associated with the response to the inquiry as history information.

3. The control apparatus according to claim 1, wherein the storage apparatus store the result associated with the response to the inquiry as history information.

4. The control apparatus according to claim 2, wherein the history information includes content of the response and information regarding date and time of the response.

5. The control apparatus according to claim 4, wherein the history information further includes identification information regarding the first user.

6. The control apparatus according to claim 1, wherein the circuitry is further configured to control the equipment based on the control content.

7. The control apparatus according to claim 6, wherein:
   the authority information indicates whether the first user has authority of response, and
   when the response to the inquiry is made by the first user, the circuitry is further configured to control the equipment based on whether the first user has the authority of response.

8. The control apparatus according to claim 7, wherein:
   when the first user has the authority of response, the circuitry is further configured to execute the control content on the equipment, and
   when the first user does not have the authority of response, the circuitry is further configured to deny execution of the control content on the equipment.

9. The control apparatus according to claim 7, wherein, when an age of the first user falls within a specific range, the first user has the authority of response.

10. The control apparatus according to claim 7, wherein the circuitry is further configured to:
    acquire a captured image of the first user; and
    specify the first user based on recognition of the captured image of the first user.

11. The control apparatus according to claim 6, wherein the circuitry is further configured to execute the control content on the identified equipment.

12. The control apparatus according to claim 1, wherein:
    when the response to the inquiry is made by the first user, and the equipment has received control input from a second user different from the first user, the circuitry is further configured to make another inquiry to the second user,
    the another inquiry is to approve the response to the inquiry, and
    the circuitry is further configured to control the equipment based on another response by the second user.

13. The control apparatus according to claim 1, wherein:
    when the response to the inquiry is made by the first user, and the equipment has received control input from a second user different from the first user, the circuitry is further configured to make another inquiry to the second user,
    the another inquiry is to approve the control content, and
    the circuitry is further configured to control the equipment based on another response that is received from the second user and the control content.

14. The control apparatus according to claim 1, wherein the circuitry is further configured to:
    cause a communication circuit to transmit the inquiry to a mobile terminal, and
    control the equipment based on the response to the inquiry, the response is received from the mobile terminal.

15. The control apparatus according to claim 14, wherein the communication circuit transmits the inquiry to the mobile terminal after a specific time period is lapsed since the inquiry.

16. The control apparatus according to claim 14, wherein:
the circuitry is further configured to cause the communication circuit to transmit the response to the inquiry to the storage apparatus, and
the response to the inquiry is received from the mobile terminal.

17. The control apparatus according to claim 1, wherein the request includes information indicating a condition for the first user authorized to approve the request.

18. The control apparatus according to claim 1, wherein the circuitry is further configured to make the inquiry to the first user via sound output.

19. A control method, comprising:
receiving a request from an external apparatus;
identifying an equipment to be controlled from a plurality of equipment based on the received request;
determining control content of the identified equipment based on a specific condition and the received request;
outputting, based on the received request, information to a first user,
wherein the information is output for making an inquiry to the first user for approval regarding the determined control content of the identified equipment;
storing a result associated with a response to the inquiry, where the stored result is a specific result when the response to the inquiry is not received for a time period after the inquiry; and
controlling, by a processor, the identified equipment, based on the result associated with the response to the inquiry and authority information associated with the first user.

20. A non-transitory computer-readable medium having stored thereon, computer-executable instructions, which when executed by a computer, cause the computer to execute operations, the operations comprising:
receiving a request from an external apparatus;
identifying an equipment to be controlled from a plurality of equipment based on the received request;
determining control content of the identified equipment based on a specific condition and the received request;
outputting, based on the received request, information to a first user,
wherein the information is outputted for making an inquiry to the first user for approval regarding the determined control content of the identified equipment;
storing a result associated with a response to the inquiry, where the stored result is a specific result when the response to the inquiry is not received for a time period after the inquiry; and
controlling the identified equipment, based on the result associated with the response to the inquiry and authority information associated with relating to the first user.

* * * * *